US010351701B2

(12) United States Patent
Georgelos et al.

(10) Patent No.: US 10,351,701 B2
(45) Date of Patent: *Jul. 16, 2019

(54) ADDITIVE FOR PERFORMANCE ENHANCEMENT OF BIOPOLYMER ARTICLES

(75) Inventors: Paul Georgelos, Naperville, IL (US); Pat Montefusco, Genoa, IL (US); Jeanne M. Skaggs, Arlington Heights, IL (US); Bohdan Wyslotsky, Algonquin, IL (US)

(73) Assignee: Sonoco Development Inc., Hartsville, SC (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/069,260

(22) Filed: Mar. 22, 2011

(65) Prior Publication Data
US 2011/0226789 A1 Sep. 22, 2011

Related U.S. Application Data

(60) Provisional application No. 61/316,313, filed on Mar. 22, 2010.

(51) Int. Cl.
*B32B 3/00* (2006.01)
*B65D 8/04* (2006.01)
(Continued)

(52) U.S. Cl.
CPC .............. *C08L 67/04* (2013.01); *B32B 27/08* (2013.01); *B32B 27/18* (2013.01); *B32B 27/20* (2013.01);
(Continued)

(58) Field of Classification Search
CPC ...... C08L 67/03; C08L 67/04; C08L 2310/00; C08L 67/02; C08L 2201/06;
(Continued)

(56) References Cited

U.S. PATENT DOCUMENTS 5,252,642 A * 10/1993 Sinclair .................. A61L 15/26
524/108
5,589,544 A * 12/1996 Horrion .................. C08J 3/005
525/176
(Continued)

FOREIGN PATENT DOCUMENTS

CN 101402786 A * 4/2009
CN 101541853 A 9/2009
(Continued)

OTHER PUBLICATIONS

"Enhancing Biopolymers: Additives Are Needed for Toughness, Heat Resistance & Processability," Plastics Technology, Jul. 2008. (http://www.ptonline.com/articles/enhancing-biopolymers-additives-are-needed-for-toughness-heat-resistance-processability).*
(Continued)

*Primary Examiner* — Lee E Sanderson
(74) *Attorney, Agent, or Firm* — Marshall, Gerstein & Borun LLP (57) ABSTRACT

Embodiments relate to an additive for a biopolymer article, a method for forming the additive and biopolymer articles and sheeting containing or formed using the additive. The additive includes at least one impact modifier between 10-90 weight % of the total weight of the additive; at least one polymer color concentrate between 5-50 weight % of the total weight of the additive; and at least one carrier resin between 5-50 weight % of the total weight of the additive.

15 Claims, 7 Drawing Sheets

(51) Int. Cl.
| | |
|---|---|
| C08L 67/04 | (2006.01) |
| B32B 27/18 | (2006.01) |
| B32B 27/20 | (2006.01) |
| B32B 27/36 | (2006.01) |
| B65D 1/30 | (2006.01) |
| C08J 3/22 | (2006.01) |
| C08L 23/08 | (2006.01) |
| C08L 67/02 | (2006.01) |
| B32B 27/08 | (2006.01) |
| B32B 27/32 | (2006.01) |
| C08K 3/22 | (2006.01) |

(52) U.S. Cl.
CPC ............ *B32B 27/32* (2013.01); *B32B 27/36* (2013.01); *B65D 1/30* (2013.01); *C08J 3/226* (2013.01); *C08L 23/08* (2013.01); *C08L 67/02* (2013.01); *B32B 2250/24* (2013.01); *B32B 2307/558* (2013.01); *B32B 2307/7163* (2013.01); *B32B 2307/732* (2013.01); *B32B 2439/00* (2013.01); *B32B 2439/70* (2013.01); *B32B 2553/00* (2013.01); *C08J 2367/04* (2013.01); *C08J 2423/08* (2013.01); *C08J 2467/04* (2013.01); *C08K 3/22* (2013.01); *C08K 2003/2241* (2013.01); *C08L 2205/03* (2013.01); *C08L 2310/00* (2013.01); *Y10T 428/31931* (2015.04)

(58) Field of Classification Search
CPC .. C08L 2205/02; C08L 2205/03; C08L 33/04; C08L 33/06; C08L 33/062; C08L 23/08; C08L 23/0884; B65D 1/30; C08J 2467/04; C08J 2467/06; C08J 2367/02; C08J 2367/04; C08J 2467/02; C08J 3/20; C08J 3/22; C08J 3/223; C08J 3/226; C08J 2423/08; Y10T 428/12; Y10T 428/1334; Y10T 428/1352
USPC ......... 220/23.8, 495.04, 723; 428/34.9, 35.1, 428/35.2, 35.7, 220, 213, 221, 480, 483
See application file for complete search history.

(56) References Cited

U.S. PATENT DOCUMENTS

| | | | | |
|---|---|---|---|---|
| 5,782,376 | A * | 7/1998 | Brauner et al. ................ | 220/669 |
| 5,874,486 | A | 2/1999 | Bastioli et al. | |
| 5,883,199 | A | 3/1999 | McCarthy et al. | |
| 6,020,414 | A * | 2/2000 | Nelsen ................... | C08L 23/08 524/424 |
| 6,312,639 | B1 * | 11/2001 | Ertle et al. ................ | 264/349 |
| 6,329,465 | B1 | 12/2001 | Takahashi et al. | |
| 6,495,656 | B1 * | 12/2002 | Haile et al. ................ | 528/272 |
| 6,872,674 | B2 * | 3/2005 | Williams et al. ............ | 442/416 |
| 6,916,770 | B2 | 7/2005 | Nitzsche | |
| 6,943,214 | B2 | 9/2005 | Flexman | |
| 7,381,772 | B2 | 6/2008 | Flexman et al. | |
| 7,595,363 | B2 | 9/2009 | Uradnisheck | |
| 7,902,274 | B2 | 3/2011 | Prusak et al. | |
| 2004/0164076 | A1 * | 8/2004 | Baker ..................... | B65D 1/30 220/23.4 |
| 2004/0242803 | A1 * | 12/2004 | Ohme ..................... | C08L 67/04 525/400 |
| 2005/0011898 | A1 * | 1/2005 | Van Handel et al. ........ | 220/507 |
| 2005/0038189 | A1 | 2/2005 | Takimoto et al. | |
| 2005/0154114 | A1 * | 7/2005 | Hale ......................... | C08J 5/18 524/436 |
| 2006/0173133 | A1 * | 8/2006 | Flexman ................. | C08L 67/04 525/191 |
| 2007/0131904 | A1 * | 6/2007 | Crossland ............ | C09K 19/406 252/299.67 |
| 2007/0299212 | A1 * | 12/2007 | Smillie .................... | C08J 3/226 525/425 |
| 2008/0027178 | A1 * | 1/2008 | Uradnisheck ................. | 525/190 |
| 2008/0085959 | A1 * | 4/2008 | Mueller ................... | C08J 3/226 524/190 |
| 2008/0119589 | A1 | 5/2008 | Maewski et al. | |
| 2009/0005514 | A1 * | 1/2009 | Uradnisheck ............. | C08J 5/18 525/329.5 |
| 2009/0099313 | A1 | 4/2009 | Uradnisheck | |
| 2009/0156732 | A1 | 6/2009 | Rajaraman et al. | |
| 2009/0191371 | A1 | 7/2009 | Uradnisheck | |
| 2009/0209704 | A1 | 8/2009 | Uradnisheck | |
| 2009/0281203 | A1 * | 11/2009 | Riebel et al. .................... | 521/44 |
| 2010/0028512 | A1 * | 2/2010 | Kriegel ................... | C08B 30/18 426/397 |
| 2010/0133644 | A1 * | 6/2010 | Hebert .................. | H01L 29/402 257/476 |
| 2010/0280193 | A1 | 11/2010 | Kobayashi et al. | |
| 2011/0218308 | A1 * | 9/2011 | Nozue et al. ................. | 526/127 |
| 2012/0142823 | A1 | 6/2012 | Cygan et al. | |

FOREIGN PATENT DOCUMENTS

| | | | |
|---|---|---|---|
| EP | 2065435 A1 | 6/2009 | |
| JP | 2003-119352 A | 4/2003 | |
| JP | 2009-169577 A | 7/2009 | |
| WO | WO 2007027027 A1 * | 3/2007 | |
| WO | WO 2007129893 A1 * | 11/2007 | |
| WO | WO 2009070858 A1 * | 6/2009 | |
| WO | 2010127341 A1 | 11/2010 | |

OTHER PUBLICATIONS

"Titanium Dioxide," Wikipedia. (http://web.archive.org/web/20090226124501/http://en.wikipedia.org/wiki/Titanium_dioxide).*
"Functionalized Polymers," DuPont. (http://web.archive.org/web/20081219011941/http://www2.dupont.com/Directories/en_US/Products_Services_Index/Plastics_Polymers_Elastomers/Functionalized_Polymers.html).*
"Impact modifiers: how to make your compound tougher, Plastics, Additives and Compounding," vol. 6, Issue 3, May-Jun. 2004, pp. 46-49, ISSN 1464-391X, 10.1016/S1464-391X(04)00203-X. (http://www.sciencedirect.com/science/article/pii/S1464391X0400203X).*
"Functionalized Polymers," DuPont, Dec. 19, 2008. (http://web.archive.org/web/20081219011941/http://www2.dupont.com/Directories/en_US/Products_Services_Index/Plastics_Polymers_Elastomers/Functionalized_Polymers.html).*
Nolan-ITU, "Environment Australia Biodegradable Plastics-Developments and Environmental Impacts," Oct. 2002. (http://www.environment.gov.au/archive/settlements/publications/waste/degradables/biodegradable/pubs/biodegradable.pdf).*
Cybulski, Eric. Plastic Conversion Processes: A Concise and Applied Guide, Boca Raton; Taylor Francis, 2009, Print, pp. 23, 28, and 29. ISBN 978-1-4200-9406-0.*
Liao et al. Diffusion of CO2 Molecules in Polyethylene Terephthalate/Polylactide Blends Estimated by Molecular Dynamics Simulations, Bulletin of Korean Chemical Society, 2013, vol. 34 No. 3.*
Srithep, Yottha et al. Processing and Characterization of Recycled Poly(ethylene terephthlate) blends with Chain Extenders (CE), Thermoplastic Elastomers (TPE), and/or Poly(butylene adipate-co-terephthalate (PBAT), University of Wisconsin, 2010 available online at https://www.wisconsin.edu/waste-research/download/final_reports/2010_final_reports/1.*
PCT/US11/29453, International Search Report and Written Opinion of the International Searching Authority, dated May 23, 2011.
Third Office Action (English translation), Chinese patent application No. CN201180025266.6, dated Mar. 17, 2015.
Third Office Action (English translation), Chinese patent application No. 201180025238.4, dated Feb. 28, 2015.
Notice of Reasons for Refusal (English translation), Japanese patent application No. 2013-501404, dated Dec. 9, 2014.

(56) References Cited

OTHER PUBLICATIONS

Extended European Search Report, European patent application No. 11760081.7, dated Mar. 1, 2017.

* cited by examiner

ADDITIVE FOR PERFORMANCE ENHANCEMENT OF BIOPOLYMER ARTICLES

CLAIM FOR PRIORITY

This application claims priority from U.S. Provisional Application Ser. No. 61/316,313 filed Mar. 22, 2010, the complete subject matter of which is incorporated herein by reference in its entirety.

CROSS REFERENCE TO RELATED APPLICATIONS

The following related patent applications, assigned to the same assignee hereof and filed on the same date herewith in the names of the same inventors as the present application, disclose related subject matter, the complete subject matter of which is incorporated herein by reference in its entirety: Biopolymer Roll stock for Form-Fill-Seal Packaging, U.S. Ser. No. 13/069,327.

FIELD OF THE INVENTION

The invention relates to additives that enhance the performance of biopolymer articles. More particularly, the invention relates to polymer additives used to create biopolymer articles, including sheets or molded articles, enhancing the performance of the sheets and articles.

BACKGROUND OF THE INVENTION

Currently petroleum-based polymers or non-bio-degradable materials and blends are used to form sheets or molded parts. Such materials are not readily degradable and are therefore considered undesirable. One approach to this problem has been to use biopolymer sheeting or a biopolymer blend including a Polylactic Acid polymer (PLA) or copolymer with a second polymer to form such rigid structures. Unfortunately, current biopolymer materials and blends are not suitable for forming such rigid structures, in that such current biopolymer materials are not useful for producing molded parts having the desired impact resistance and are further unsuited for drawing depth to width ratios within the desired temperature forming windows as required by the packaging industry to produce such rigid structures.

For the foregoing reasons, it would be desirable to have an additive that enhances the performance of biopolymer articles.

SUMMARY OF THE INVENTION

One embodiment relates to an additive for a biopolymer article. The additive includes at least one impact modifier between 10-90 weight % of the total weight of the additive; and at least one pigment/dye compounded in a carrier resin, where the carrier resin is between 10-90 weight % of the total weight of the additive.

One embodiment relates to an additive for a biopolymer article. The additive includes at least one impact modifier between 10-90 weight % of the total weight of the additive; at least one polymer color concentrate between 5-50 weight % of the total weight of the additive; and at least one carrier resin between 5-50 weight % of the total weight of the additive.

Another embodiment relates to a pellet. The pellet includes at least one impact modifier between 10-90 weight % of the total weight of the pellet; at least one polymer color concentrate between 5-50 weight % of the total weight of the pellet; and at least one carrier resin between 5-50 weight % of the total weight of the pellet.

Yet another embodiment relates to a method of forming an additive. The method includes providing at least one impact modifier, at least one polymer color concentrate and at least one carrier resin; blending the at least one impact modifier, the at least one polymer color concentrate and the at least one carrier resin forming an additive blend, where the at least one impact modifier is between 10-90 weight % of the total weight of the additive blend, the at least one polymer color concentrate is between 5-50 weight % of the total weight of the additive blend and the at least one carrier resin is between 5-50 weight % of the total weight of the additive blend; and molding the additive blend.

One more embodiment relates to a biopolymer article. The article includes at least one biopolymer resin between 75-92 weight % of the total weight percent of the biopolymer article; and an additive between 8-25 weight % of the total weight percent of the biopolymer article. It should be appreciated that while the additive is disclosed as 8-25 weight % of the biopolymer, embodiments are contemplated at less than 8 weight %. The additive includes at least one impact modifier between 10-90 weight % of the total weight of the additive; at least one polymer color concentrate between 5-50 weight % of the total weight of the additive; and at least one carrier resin between 5-50 weight % of the total weight of the additive, whereby the biopolymer article has a predetermined thickness and impact resistance.

Yet another embodiment relates to a biopolymer extruded sheet. The sheet includes at least one biopolymer resin between 70-92 weight % of the total weight of the extruded sheet; and an additive between 8-25 weight % of the total weight of the sheeting. The additive includes at least one impact modifier between 10-90 weight % of the total weight of the additive; at least one polymer color concentrate between 5-50 weight % of the total weight of the additive; and at least one carrier resin between 5-50 weight % of the total weight of the additive, whereby the extruded sheet has a predetermined thickness and impact resistance.

In one or more embodiments the at least one impact modifier is an ethylene copolymer, the at least one polymer color concentrate is TiO$_2$ based and/or the at least one carrier resin and/or the biopolymer resin is a material selected from the group consisting of polylactic acid polymer (PLA), aliphatic-aromatic polyesters polymers, poly (3-hydroxyalkanoate) polymer (PHA), polycaprolactone and functionalized polylactic acid. More specifically, the carrier resin may be a functionalized polylactic acid polymer. A non-limiting example of the impact modifier is an ethylene copolymer impact modifier such as DuPont's® Biomax® Strong resins, including for example Biomax® Strong 120, although other Biomax® Strong resins are contemplated, where the impact modifier may be designed for food packaging or other uses.

In at least one embodiment, the additive is in a pellet form.

In one or more embodiments, the predetermined impact resistance has a Gardner Impact value between 3 and 150 in-lbs (17 in-lbs or more for example). More specifically, the predetermined impact resistance has a Gardner Impact value of about 17 in-lbs at 30 mil thickness. Further, the predetermined thickness is between about 10 mils and 80 mils thick.

In one or more embodiments, the at least one biopolymer resin is between 70-90 weight % of the total weight of the article/sheeting, the at least one impact modifier is between 5-15 weight % of the total weight of the article/sheeting, the at least one polymer color concentrate is between 5-15 weight % of the total weight of the article/sheeting and the at least one carrier resin is between 5-10% of the total weight of the article/sheeting. In yet one or more embodiments, the article may be thermoformed into a multi-compartment, breakaway cup using radiant heat, contact heat or any other suitable method. The cup may having a range of depth to width ratios of 10:1 to 1:4, where embodiments are contemplated having ranges of depth to width ratios of 10:1 to 2:1. ranges of depth to width ratios of 8:1 to 4:1. and ranges of depth to width ratios of 2:1 to 1:4 and/or be scored for separation into individual compartments.

In one or more embodiments, the article may be formed into multi-compartment packages using any suitable method including injection molding, blow molding, thermoforming and the like.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF PRESENTLY PREFERRED EMBODIMENTS

In describing the presently preferred embodiments and methods according to the invention, a number of terms will be used, the definitions or scope of which will now be described.

As defined herein, the term "color concentrate" refers to a pelletized plastic material containing highly loaded pigments which are blended in precise amounts with a base resin or compound to achieve a predetermined final color.

As defined herein, the term "impact resistance" refers to the mean failure energy of materials (alternatively referred to as "MFE" expressed in in-lbs) according to the energy required to cause 50% of the specimens to crack or break flat, rigid plastic specimens under various specified conditions of impact of a striker impacted by a falling weight and is expressed as Gardner Impact values (i.e. MFE) as described in the associated ASTM Designation D 5420-04—Standard Test Method for Impact Resistance of Flat, Rigid Plastic Specimen by Means of a Striker Impacted by a Falling Weight (Gardner Impact) incorporated herein as one of the Attachments.

As defined herein, the term "multilayered film", "multilayered films", "multilayered sheet", "multilayered structure" or "one or more layers" refers to a plurality of layers in a single film or substrate structure generally in the form of a sheet or web which may be made from a polymer material, a non-polymer material, a bio-polymer material, some combination thereof or the like for example, bonded together by any conventional means known in the art (co-extrusion, extrusion coating, lamination, solvent coating, emulsion coating, suspension coating, adhesive bonding, pressure bonding, heat sealing, thermal lamination, ultrasonic welding, some combination thereof or the like for example).

As defined herein, the term "polymer" refers to the product of a polymerization reaction, and is inclusive of homopolymers, copolymers, terpolymers, or the like for example, the layers of a film or film substrate can consist essentially of a single polymer, or can have still additional polymers together therewith, i.e., blended therewith.

As defined herein, the term "copolymer" refers to polymers formed by the polymerization of at least two different monomers. For example, the term "copolymer" includes the co-polymerization reaction product of ethylene and an alpha-olefin, such as 1-hexene. The term "copolymer" is also inclusive of, for example, the co-polymerization of a mixture of ethylene, propylene, 1-propene, 1-butene, 1-hexene, and 1-octene. As defined herein, a copolymer identified in terms of a plurality of monomers, e.g., "propylene/ethylene copolymer", refers to a copolymer in which either monomer may co-polymerize in a higher weight or molar percent than the other monomer or monomers. However, the first listed monomer preferably polymerizes in a higher weight percent than the second listed monomer.

As defined herein, the term "coextruded" refers to a material formed by the process of extruding two or more polymeric materials through a single die with two or more orifices arranged so that the extrudates merge and weld together into a laminar structure before chilling and solidifying. The substrates described herein may be generally prepared from dry resins which are melted in an extruder and passed through a die to form the primary material, most commonly in tube or sheet form. In the coextruded films described herein, all layers were simultaneously coextruded, cooled via water, chilled metal roll, or air quenching. Unless otherwise noted, the resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the film, by blending prior to extrusion. The resins and any additives are introduced to an extruder where the resins are melt plasticized by heating and then transferred to an extrusion (or co-extrusion) die for formation into a tube or any other form using any suitable extrusion method. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

As defined herein, the term "polyester" refers to homopolymers or copolymers having an ester linkage between monomer units which may be formed, for example, by condensation polymerization reactions between a dicarboxylic acid and a glycol. The ester monomer unit can be represented by the general formula: [RCO.sub.2R'] where R and R'=alkyl group. The dicarboxylic acid may be linear or aliphatic, i.e., oxalic acid, malonic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The glycols may be straight-chained or branched. Specific examples include ethylene glycol, propylene glycol, trimethylene glycol, 1,4-butane diol, neopentyl glycol and the like. An example of preferred polyester is polyethylene terephthalate copolymer.

As defined herein a "polymer sheet" or "sheeting" refers to a material composed of polymers and having a thickness of about 10 MILs (0.01 inches) or greater, while a "polymer film" is defined as a material composed of polymers and having a thickness of less than 10 MILs (0.01 inches).

As defined herein, the term "rigid" refers to a material capable of holding or retaining its original shape of form or returning to its original shape or form under return to initial conditions and is substantially firm in final form.

As defined herein the term "biodegradable" refers to material which, when exposed to an aerobic and/or anaerobic environment, ultimately results in the reduction to monomeric components due to microbial, hydrolytic, and/or chemical actions. Under aerobic conditions, biodegradation leads to the transformation of the material to end products such as carbon dioxide and water. Under anaerobic conditions, biodegradation leads to the transformation of the materials to carbon dioxide, water, and methane. The biodegradability process is often described as mineralization. Biodegradability means that all organic constituents of the films are subject to decomposition eventually through biological or any other natural activity.

Non-limiting examples of other optional ingredients that may be included in the film, sheet or laminate described herein include aromatic/aliphatic polyester copolymers made more readily hydrolytically cleavable, and hence more likely biodegradable, such as those described in U.S. Pat. Nos. 5,053,482; 5,097,004; 5,097,005; and 5,295,985; biodegradable aliphatic polyesteramide polymers, polycaprolactones, polyesters or polyurethanes derived from aliphatic polyols (i.e., dialkanoyl polymers), polyamides including polyethylene/vinyl alcohol copolymers, cellulose esters or plasticized derivatives thereof, salts, slip agents, crystallization accelerators such as nucleating agents, crystallization retarders, odor masking agents, cross-linking agents, emulsifiers, surfactants, cyclodextrins, lubricants, other processing aids, optical brighteners, antioxidants, flame retardants, dyes, pigments, fillers, proteins and their alkali salts, waxes, tackifying resins, extenders, antiblocking agents, antistatic agents, or mixtures thereof. Slip agents may be used to help reduce the tackiness or coefficient of friction in the film. Also, slip agents may be used to improve film stability, particularly in high humidity or temperatures.

FIGS. 1-4 depict views of a biopolymer article, generally designated 10, in accordance with one embodiment. In one embodiment, the article 10 is formed via any suitable manner including coextrusion, blow molding, thermoforming and the like.

In the embodiment illustrated in FIGS. 1-4, article 10 comprises four cups 12 (alternatively referred to as a 4-pack), arranged in two rows of two, where each cup 12 has a longitudinal sidewall 14, having first end 16 and second end 18, and bottom 20 at second end 18 (best viewed in FIG. 4) defining compartment or chamber 22 (best viewed in FIG. 3) adapted to receive a material (yogurt or other foodstuffs/materials). The cup 12 may have a depth to width ratio of 10:1 to 2:1; and/or scored for separation into individual compartments. In at least one embodiment, cup 12 has 4 longitudinal sidewalls 14 (two sets of two opposing sidewalls 14) joined or connected to bottom 20.

FIGS. 1-4 further illustrate cup 12 having a lip, flange or strip 24 at end 16, joining the individual cups 12 together. In at least one embodiment, the 4-pack 10 is formed as a single article, then the lip 24 is cut and scored (forming score lines 26 for example) into a multi-compartment, breakaway cups as is well known in the art. In the illustrated embodiment, the star punch 28 is formed, enabling easy separation of the individual cups 12. In at least one embodiment, article 10 includes lidstock 30 sealing compartment or chamber 22 (See FIG. 1-2).

Figure 1:
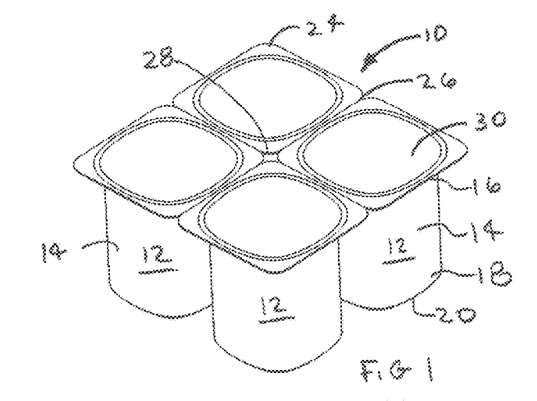
FIG. 1 is a view of a biopolymer article in accordance with one embodiment.
Figure 2:
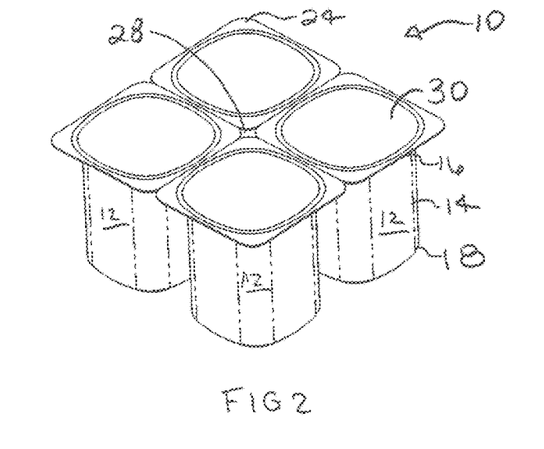
FIG. 2 is another view of the biopolymer article of FIG. 1 in accordance with one embodiment.
Figure 3:
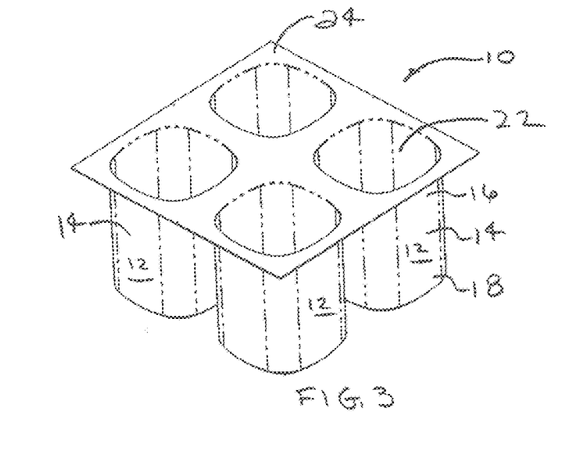
FIG. 3 is yet another view of a biopolymer article of FIG. 1 in accordance with one embodiment.
Figure 4:
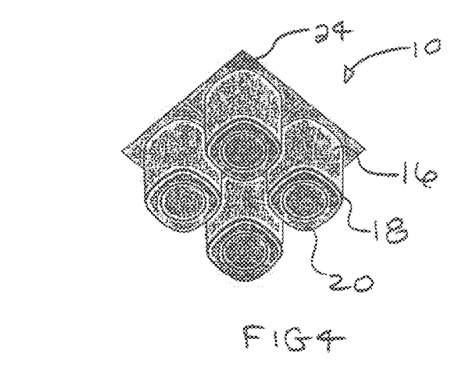
FIG. 4 is still another of the biopolymer article of FIG. 1 in accordance with one embodiment.
Figure 5:
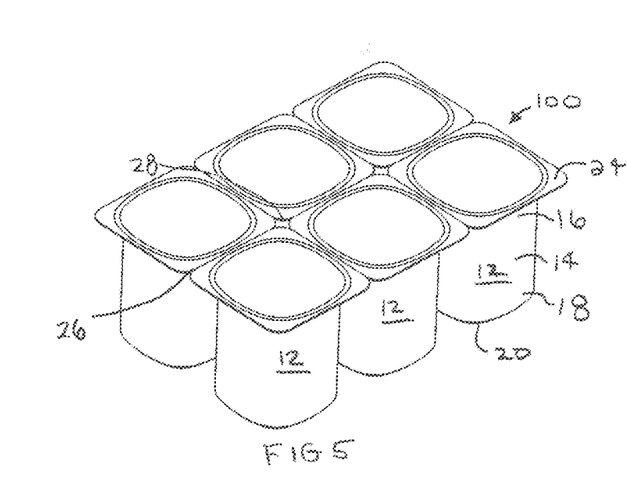
FIG. 5 is a view of another biopolymer article in accordance with one embodiment.
Figure 6:
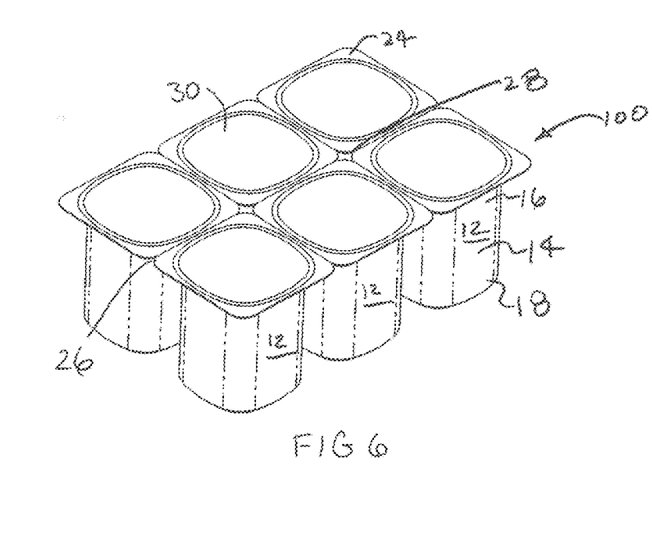
FIG. 6 is another view of the biopolymer article of FIG. 5 in accordance with one embodiment.
Figure 7:
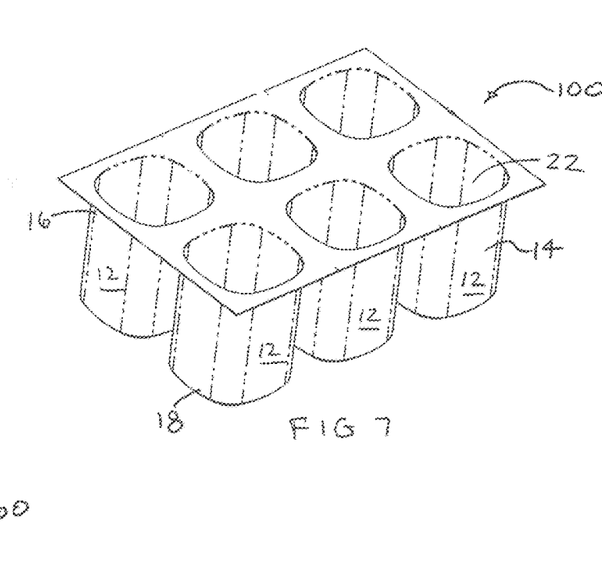
FIG. 7 is another view of the biopolymer article of FIG. 5 in accordance with one embodiment.

FIGS. 5-7 depict another view of a biopolymer article, generally designated 100, in accordance with one embodiment. In one embodiment, the article 100 is formed via any suitable manner including injection molding, blow molding, thermoforming and the like. In the embodiment illustrated in FIGS. 5-7, article 100 comprises six cups 12 (alternatively referred to as a 6-pack), arranged in two rows of three, where each cup 12 has a longitudinal sidewall 14, first and second ends 16 & 18, and bottom 20 defining compartment or chamber 22 adapted to receive a material (yogurt or other foodstuffs/materials) and lip 24.

Figure 8:
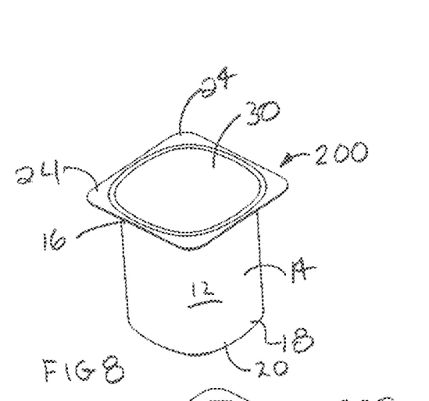
FIG. 8 is a view of yet another biopolymer article in accordance with one embodiment.
Figure 9:
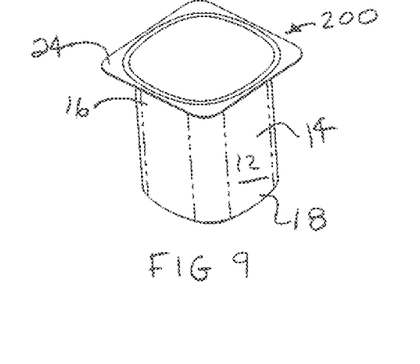
FIG. 9 is another view of the biopolymer article of FIG. 8 in accordance with one embodiment.
Figure 10:
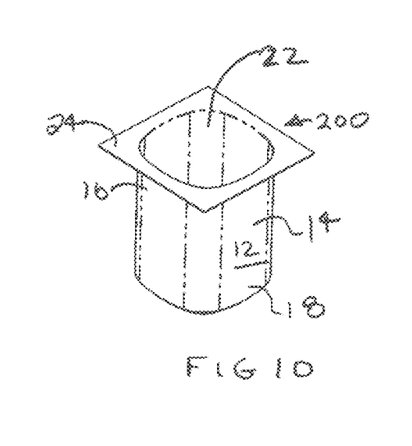
FIG. 10 is another view of the biopolymer article of FIG. 8 in accordance with one embodiment.

FIGS. 8-10 depict another view of a biopolymer article, generally designated 200, in accordance with one embodiment. In one embodiment, the article 200 is formed via any suitable manner including injection molding, blow molding, thermoforming and the like. In the embodiment illustrated in FIGS. 8-10, article 200 comprises a single cup 12 having a longitudinal sidewall 14, first and second ends 16 & 18 and bottom 20 defining compartment or chamber 22 adapted to receive a material (yogurt or other foodstuffs/materials) and lip 24.

Figure 11:
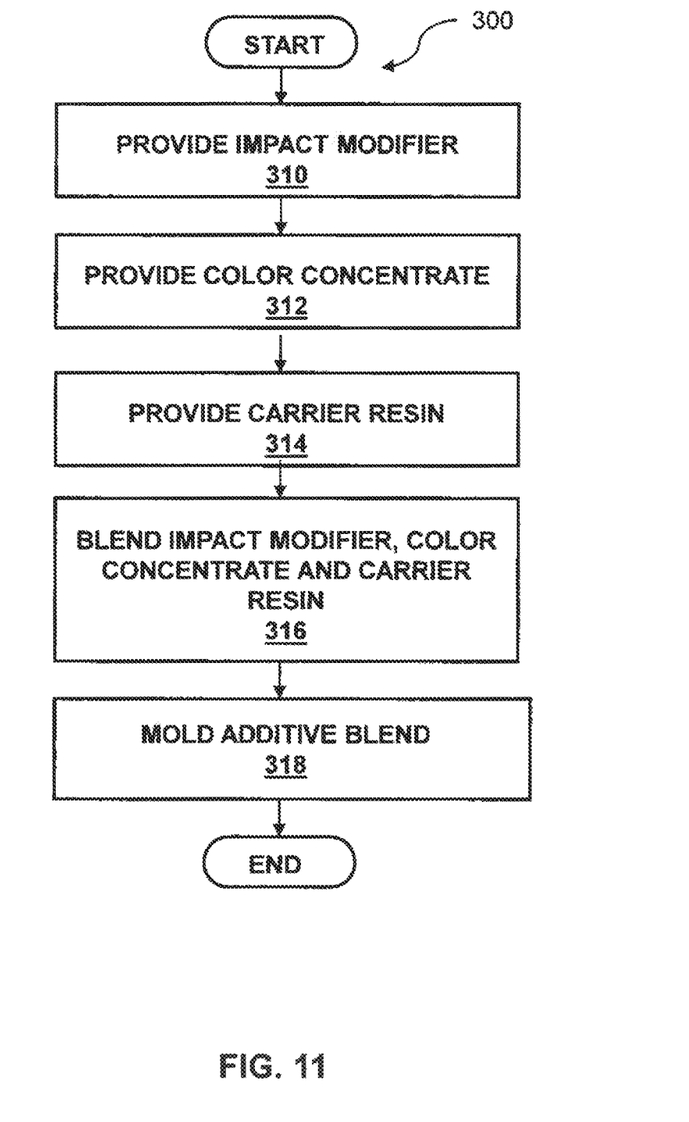
FIG. 11 is a flowchart of a method for forming an additive in accordance with one embodiment.

FIG. 11 illustrates a flowchart of a method for forming an additive, generally designated 300, in accordance with one embodiment. The method 300 includes providing at least one impact modifier, block 310, at least one polymer color concentrate, block 312 and at least one carrier resin, block 314. The at least one impact modifier, at least one polymer color concentrate and the at least one carrier resin are blended forming an additive blend, block 316, where the at least one impact modifier is between 10-90 weight % of the total weight of the additive blend, the at least one polymer color concentrate is between 5-50 weight % of the total weight of the additive blend and the at least one carrier resin is between 5-50 weight % of the total weight of the additive blend. The additive blend is then molded, block 318. More particularly, the additive blend may be pelletized under water method to form microbeads. While a water method is discussed, any method for forming/pelletizing is contemplated.

One or more embodiment relates to an additive for a biopolymer article. The additive includes at least one impact modifier between 10-90 weight % of the total weight of the additive; and at least one pigment/dye compounded in a carrier resin, where the carrier resin is between 10-90 weight % of the total weight of the additive.

In at least one embodiment the additive includes at least one impact modifier between 10-90 weight % of the total weight of the additive; at least one polymer color concentrate between 5-50 weight % of the total weight of the additive; and at least one carrier resin between 5-50 weight % of the total weight of the additive. Embodiments may include the at least one impact modifier is an ethylene copolymer; the at least one polymer color concentrate is TiO.sub.2 base, and the at least one carrier resin is a material selected from the group consisting of polylactic acid polymer (PLA), aliphatic-aromatic polyesters polymers, poly (3-hydroxyalkanoate) polymer (PHA), polycaprolactone and functionalized polylactic acid. A non-limiting example of the impact modifier is an ethylene copolymer impact modifier such as DuPont's® Biomax® Strong resins, including for example Biomax® Strong 120, although other Biomax® Strong resins are contemplated, where the impact modifier may be designed for food packaging or other uses.

Yet another embodiment may include a pellet, where the pellet includes at least one impact modifier between 10-90 weight % of the total weight of the pellet; at least one polymer color concentrate between 5-50 weight % of the total weight of the pellet; and at least one carrier resin between 5-50 weight % of the total weight of the pellet. Embodiments of the pellet may include the least one impact modifier is an ethylene copolymer, the at least one polymer color concentrate is TiO.sub.2 based and/or the at least one carrier resin is a material selected from the group consisting of polylactic acid polymer (PLA), aliphatic-aromatic polyesters polymers, poly (3-hydroxyalkanoate) polymer (PHA), polycaprolactone, and functionalized polylactic acid. One non-limiting example of the impact modifier is an ethylene copolymer impact modifier such as DuPont's® Biomax® Strong resins, including for example Biomax® Strong 120, although other Biomax® Strong resins are contemplated, where the impact modifier may be designed for food packaging or other uses.

Figure 12:
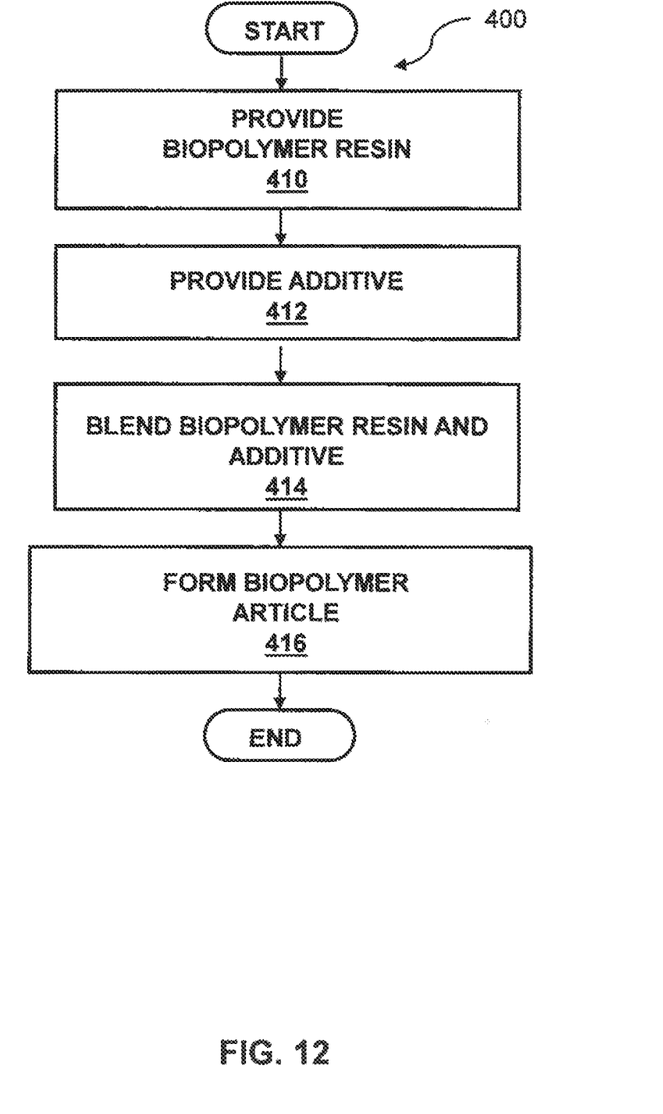
FIG. 12 is a flowchart of a method for forming a biopolymer article using an additive similar to that of FIG. 10 in accordance with one embodiment.

FIG. 12 is a flowchart of a method for forming a biopolymer article, generally designated 400 using an additive similar to that provide above. Method 400 includes providing a biopolymer resin, block 410, and an additive, block 412. The biopolymer resin and additive are blended, block 414 and a biopolymer article is formed, 416.

In at least one embodiment the biopolymer article includes at least one biopolymer resin between 70-92 weight % of the total weight percent of the biopolymer article; and an additive between 8-25 weight % of the total weight percent of the biopolymer article, where the additive includes at least one impact modifier between 10-90 weight % of the total weight of the additive; at least one polymer color concentrate between 5-50 weight % of the total weight of the additive; and at least one carrier resin between 5-50 weight % of the total weight of the additive.

In one or more embodiments, the biopolymer article has a predetermined thickness and impact resistance, where the predetermined impact resistance has a Gardner Impact value between 3 and 150 in-lbs (17 in-lbs or more for example) and has a Gardner Impact value of about 17 in-lbs at 30 mil thickness. Embodiments are contemplated wherein the predetermined thickness is between about 10 mils and 80 mils thick.

In one or more embodiments, the at least one biopolymer resin is between 70-90 weight % of the total weight of the article, the at least one impact modifier is between 5-15 weight % of the total weight of the article, the at least one polymer color concentrate is between 5-15 weight % of the total weight of the article and the at least one carrier resin is between 5-10% of the total weight of the article.

Embodiments are contemplated in which the carrier resin is functionalized polylactic acid polymer; and the biopolymer resin is a resin selected from the group consisting of polylactic acid polymers (PLA), aliphatic-aromatic polyesters polymers, and poly (3-hydroxyalkanoate) polymers (PHA); the impact modifier is an ethylene copolymer and the polymer color concentrate is $TiO_2$.

Figure 13:
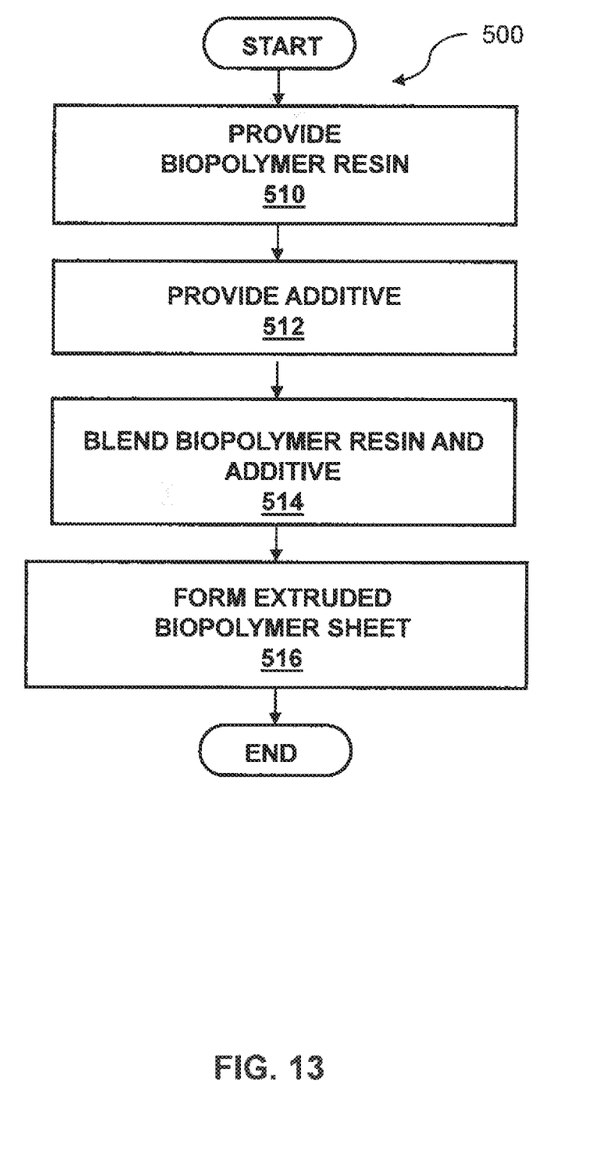
FIG. 13 is a flowchart of a method for forming a biopolymer sheeting using an additive in accordance with one embodiment.

FIG. 13 illustrates a flowchart of a method for forming biopolymer sheeting using an additive similar to that provided previously, generally designated 500, in accordance with one embodiment. Method 500 includes providing a biopolymer resin, block 510, and an additive, block 512. The biopolymer resin and additive are blended, block 514, and the biopolymer sheeting is extruded, block 516.

The biopolymer extruded sheeting includes at least one biopolymer resin between 70-92 weight % of the total weight of the extruded sheet; and an additive between 8-30 weight % of the total weight of the sheeting; where the additive contains at least one impact modifier between 10-90 weight % of the total weight of the additive; at least one polymer color concentrate between 5-50 weight % of the total weight of the additive; and at least one carrier resin between 5-50 weight % of the total weight of the additive.

The biopolymer portion may be a material selected from the group consisting of polylactic acid polymers (PLA), aliphatic-aromatic polyesters polymers, and poly (3-hydroxyalkanoate) polymers (PHA); the biopolymer resin is a resin selected from the group consisting of polylactic acid polymers (PLA), aliphatic-aromatic polyesters polymers, and poly (3-hydroxyalkanoate) polymers (PHA); the impact modifier is an ethylene copolymer; the polymer color concentrate is $TiO_2$ and the carrier resin is functionalized polylactic acid polymer.

The sheeting may, in one or more embodiments, have a predetermined thickness and impact resistance, where the predetermined impact resistance has a Gardner Impact value between 3 and 150 in-lbs (17 in-lbs or more for example). More specifically, the sheeting may have Gardner Impact value of about 17 in-lbs at 30 mil thickness. The predetermined thickness is between about 10 and 80 mils.

Embodiments are contemplated in which the sheeting includes the at least one biopolymer resin is between 70-90 weight % of the total weight of the sheeting, the at least one impact modifier is between 5-15 weight % of the total weight of the sheeting, the at least one polymer color concentrate is between 5-15 weight % of the total weight of the sheeting and the at least one carrier resin is between 5-10% of the total weight of the sheeting.

In one embodiment, the biopolymer sheeting is a monolayer or multilayer sheet, and is used as a single sheet or has another sheet joined thereto. The biopolymer sheeting is between about 10 mils and 80 mils thick, more particularly between about 12 mils and 50 mils thick and has a predetermined temperature forming window between 180° F. and 350° F., more particularly between 220° F. and 275° F. In at least one embodiment, the cup may having a range of depth to width ratios of 10:1 to 1:4, where embodiments are contemplated having ranges of depth to width ratios of 10:1 to 2:1. ranges of depth to width ratios of 8:1 to 4:1. and ranges of depth to width ratios of 2:1 to 1:4 2:1 to 1:4, alternatively 10:1 to 2:1 (8:1 to 4:1 for example).

In one embodiment, the biopolymer sheeting has a predetermined impact resistance, MFE or energy that will cause 50% of the specimens to fail or crack or break the sheeting under various specified conditions as provided previously and in the associated ASTM Designation D 5420-04— Standard Test Method for Impact Resistance of Flat, Rigid Plastic Specimen by Means of a Striker Impacted by a Falling Weight (Gardner Impact) incorporated herein as one of the attachments. In one embodiment, the biopolymer sheeting has a Gardner Impact value greater than 3 in-lbs, more particularly between 3 and 200 in-lbs or 3 and 150 in-lbs, and even still more particularly about 17 in-lbs @ 30 mil as provided below in Table 1.

TABLE 1

| Test Number | Item | Gauge MILs | Gardner Impact 70° F. In-lbs | Gardner Impact −30° F. In-lbs |
|---|---|---|---|---|
| 1 | Control PLA (5% Process Aide) | 30 | 2 | 2 |
| 2 | 90% PLA 5% Impact modifier 5% Color Additive | 18 | 16.9 | 12.4 |
| 3 | 90% PLA 5% Color Additive 5% Impact Modifier | 15 | 30 | |
| 4 | 96% PLA 4% Impact Modifier | 14 | 4.8 | |
| 5 | 95% PLA 5% Impact Modifier | 14 | 7.1 | |
| 6 | 90% PLA 10% Impact Modifier | 14 | 11.1 | |
| 7 | 100% PLA | 14 | 2.0 | |
| 8 | 95% PLA 5% Color Additive | 14 | 2.0 | |

TABLE 1-continued

| Test Number | Item | Gauge MILs | Gardner Impact 70° F. In-lbs | Gardner Impact −30° F. In-lbs |
|---|---|---|---|---|
| 9 | 90% PLA 5% Color Additive 5% Impact Modifier | 14 | 17.4 | |
| 10 | 85% PLA 5% Color Additive 10% Impact Modifier | 14 | 18.8 | |
| 11 | 80% PLA 10% Color Additive 10% Impact Modifier | 14 | 21.0 | |
| 12 | 90% PLA 5% Color Additive 5% Impact Modifier | 14 | 18.2 | |
| 13 | 90% PLA 5% Color Additive 5% Impact Modifier | 10 | 20.4 | |
| 14 | 90% PLA 5% Color Additive 5% Impact Modifier | 15 | 16.3 | |
| 15 | 90% PLA 5% Color Additive 5% Impact Modifier | 20 | 20.8 | |
| 16 | 90% PLA 5% Color Additive 5% Impact Modifier | 25 | 27.7 | |
| 17 | 90% Repro PLA 5% Color Additive 5% Impact Modifier | 30 | 42 | |
| 18 | 90% Repro PLA 5% Color Additive 5% Impact Modifier | 30 | 40 | |
| 19 | 90% Repro PLA 5% Color Additive 5% Impact Modifier | 15 | 29.1 | |
| 20 | 90% Repro PLA 5% Color Additive 5% Impact Modifier | 30 | 44 | |
| 21 | 90% Repro PLA 5% Color Additive 5% Impact Modifier | 30 | 44 | |

TABLE 1-continued

| Test Number | Item | Gauge MILs | Gardner Impact 70° F. In-lbs | Gardner Impact −30° F. In-lbs |
|---|---|---|---|---|
| 22 | 90% Repro PLA 5% Color Additive 5% Impact Modifier | 30 | 36 | |

Repro PLA means reprocessed PLA or PLA sheeting that was cut up, cleaned and converted into flake so it can be recycled. The data in the Table I indicates that the impact strength of the control sheeting (Test #1) is 0.13 to 0.03 in*lbs/mil. However, the data further indicates that the impact strength of the biopolymer sheeting including the impact modifier and polymer color concentrate is 1.3 to 2.0 in*lbs/mil, an order of magnitude greater than the control sheeting.

Figure 14:
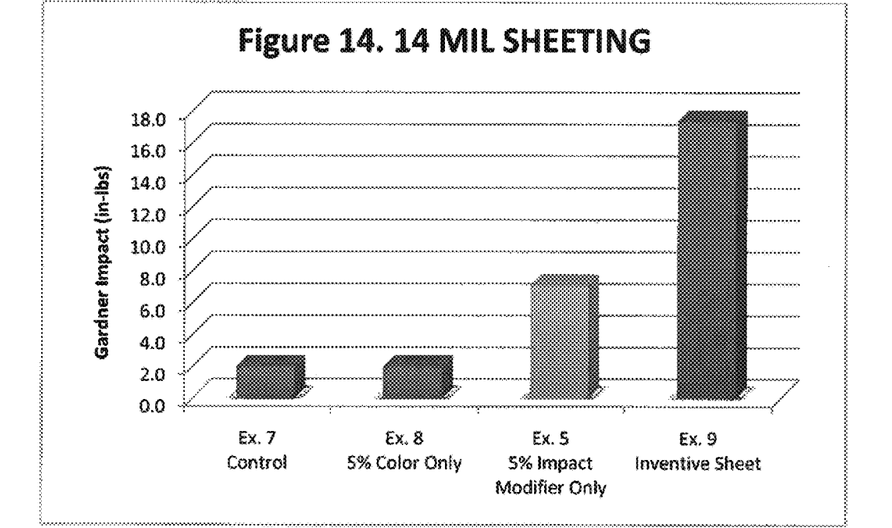
FIG. 14 is a graph showing the impact resistance (expressed as Gardner Impact values in in-lbs) for different compositions of biopolymer article/sheeting having a gauge of 14 MILs.
Figure 15:
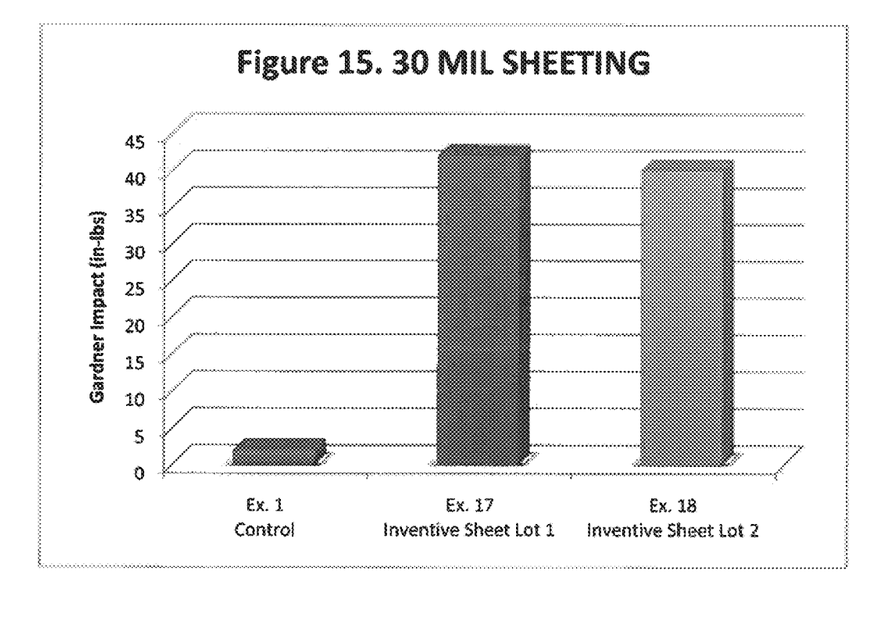
FIG. 15 is a graph showing the impact resistance (expressed as Gardner Impact values in in-lbs) for different compositions of biopolymer article/sheeting having a gauge of 30 MILs.

FIG. 14 is a graph showing the impact resistance (expressed as Gardner Impact Values in in-lbs) for different compositions of biopolymer sheeting having a gauge of 14 MILs; while FIG. 15 is a graph showing the impact resistance for different compositions of biopolymer sheeting having a gauge of 30 MILs. Thus it is clearly evident that a biopolymer sheeting including at least one biopolymer resin; at least one impact modifier and at least one polymer color concentrate (Samples 9, 17 and 18 in the Tables and Figures, where, in at least one embodiment, the polymer color concentrate includes, or is compounded in, a carrier resin (a functionalized carrier resin for example) is stronger than the control biopolymer sheeting, the biopolymer sheeting including just an impact modifier, or the biopolymer sheeting including just a polymer (such as a polymer color) by almost an order of magnitude. As provided previously, the biopolymer sheeting is a monolayer or multilayer material, and is used as a single material or has one or more materials joined or applied thereto. In at least one embodiment, the biopolymer sheeting may be comprised of at least two layers of materials, where the two layers are comprised of the same or different materials. For example, the at least two layers of materials may be comprised of the same or different biopolymer materials or one or more layers comprised of biopolymer material and one or more layers comprised of non-biopolymer material. Additionally, it is contemplated that other materials may be joined or blended with the biopolymer material, in addition to the impact modifier and color concentrates. For example, one or more different biopolymer materials, one or more non-biopolymer materials or some combination thereof may be combined with, or compounded in, the biopolymer resin (a functionalized carrier resin for example), which in turn is blended with the at least one impact modifier and at least one polymer color concentrate forming the biopolymer sheeting.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A biopolymer composition comprising:
   a polylactic acid resin present in an amount between 75 and 92 weight percent of the total weight of the composition,
   an additive present in an amount between 8 and 25 weight percent of the total weight of the composition, the additive comprising:
   an ethylene-butyl acrylate-glycidyl methacrylate terpolymer impact modifier present in an amount between 50 and 67 weight percent of the total weight of the additive; and
   a carrier resin present in an amount between 33 and 50 weight percent of the total weight of the additive,
   wherein the carrier resin is an aliphatic-aromatic polyester polymer formed from the polymerization of adipic acid, terephthalic acid, and 1,4-butanediol monomers, and the weight ratio of the ethylene-butyl acrylate-glycidyl methacrylate terpolymer impact modifier to the carrier resin is in a range of from 1:1 to 2:1.

2. The biopolymer composition of claim 1, further comprising $TiO_2$.

3. The biopolymer composition of claim 1, wherein the carrier resin is present in an amount of 33 weight percent of the total weight of the additive, and the impact modifier is present in an amount of 67 weight percent of the total weight of the additive.

4. A biopolymer article formed from a biopolymer resin comprising:
   a polylactic acid resin present in an amount between 75 and 92 weight percent of the total weight of the biopolymer article; and
   an additive pellet added to the biopolymer resin such that the additive is present in an amount between 8 and 25 weight percent of the total weight of the biopolymer article, the additive pellet comprising a mixture of:
   an ethylene-butyl acrylate-glycidyl methacrylate terpolymer impact modifier in an amount between 50 and 67 weight percent of the total weight of the additive pellet;
   a carrier resin present in an amount between 33 and 50 weight percent of the total weight of the additive pellet,
   wherein the carrier resin is an aliphatic-aromatic polyester polymer formed from the polymerization of adipic acid, terephthalic acid, and 1,4-butanediol monomers, wherein the carrier resin is compatible with the polylactic acid resin, and the weight ratio of the ethylene-butyl acrylate-glycidyl methacrylate terpolymer impact modifier to the carrier resin is in a range from 1:1 to 2:1, whereby the biopolymer article has a thickness between about 10 mils and about 80 mils, a depth and a width.

5. The biopolymer article of claim 4, having a Gardner impact resistance value of about 17 in-lbs at 30 mil thickness.

6. The biopolymer article of claim 4, further comprising $TiO_2$.

7. The biopolymer article of claim 4, having a depth to width ratio of 10:1 to 1:4.

8. The biopolymer article of claim 4, having a depth to width ratio of 10:1 to 2:1.

9. The biopolymer article of claim 4, having a depth to width ratio of 8:1 to 4:1.

10. The biopolymer article of claim 4, having a depth to width ratio of 2:1 to 1:4.

11. The biopolymer article of claim 4, which has been thermoformed into a multi-compartment breakaway cup; the cup having a depth to width ratio of 10:1 to 2:1; the multi-compartments being scored for separation into individual compartments.

12. A biopolymer extruded sheeting comprising:
   a polylactic acid resin in an amount between 75 and 92 weight percent of the total weight of the extruded sheeting; and
   an additive pellet added to the polylactic acid resin such that the additive pellet is present in an amount between 8 and 25 weight percent of the total weight of the extruded sheeting; the additive pellet containing a mixture of:
   an ethylene-butyl acrylate-glycidyl methacrylate terpolymer impact modifier present in amount between 50 and 67 weight percent of the total weight of the additive pellet; and
   a carrier resin present in an amount between 33 and 50 weight percent of the total weight of the additive pellet, wherein the carrier resin is an aliphatic-aromatic polyester polymer formed from the polymerization of adipic acid, terephthalic acid, and 1,4-butanediol monomers, and
   wherein the weight ratio of the ethylene-butyl acrylate-glycidyl methacrylate terpolymer impact modifier to the carrier resin is in a range from 1:1 to 2:1, whereby the biopolymer extruded sheeting has a thickness between about 10 mils and about 80 mils.

13. The biopolymer extruded sheeting of claim 12, having a Gardner Impact value of about 17 in-lbs at 30 mils thickness.

14. The biopolymer extruded sheeting of claim 12, further comprising $TiO_2$.

15. The biopolymer extruded sheeting of claim 12, wherein the carrier resin is present in an amount of 33 weight percent of the total weight of the additive, and the impact modifier is present in an amount of 67 weight percent of the total weight of the additive.

* * * * *